United States Patent
Sattler et al.

(10) Patent No.: US 7,475,815 B2
(45) Date of Patent: Jan. 13, 2009

(54) WIZARD FOR ANSWERING SUPPORT INQUIRIES

(75) Inventors: Juergen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 609 days.

(21) Appl. No.: 11/128,375

(22) Filed: May 13, 2005

(65) Prior Publication Data
US 2006/0259272 A1    Nov. 16, 2006

(51) Int. Cl.
*G06K 17/00*    (2006.01)
(52) U.S. Cl. .................. 235/386; 235/375; 235/379
(58) Field of Classification Search ............... 235/375, 235/379, 380, 382, 386
See application file for complete search history.

(56) References Cited

U.S. PATENT DOCUMENTS

| | | | |
|---|---|---|---|
| 6,307,925 B1 | 10/2001 | Bailis et al. | |
| 6,332,154 B2 | 12/2001 | Beck et al. | |
| 2005/0001711 A1* | 1/2005 | Doughty et al. | 340/5.74 |
| 2005/0043025 A1 | 2/2005 | Durand | |
| 2006/0101047 A1* | 5/2006 | Rice | 707/101 |

* cited by examiner

*Primary Examiner*—Karl D. Frech
(74) *Attorney, Agent, or Firm*—Kenyon & Kenyon LLP

(57) ABSTRACT

A customer support wizard that compares customer data with attributes of support notes to identify which notes are relevant, and to systematically shrink the number of candidate notes by asking the customer questions. Questions are selected based on an analysis of the attributes of the remaining candidate notes. If no note is found, the customer's data is sent to a development team so that a new solution can be prepared and sent back to the customer. If a customer selects a note that is not an exact match, an assumption can be made that the note will solve the customer's problem after a threshold amount of time has transpired without further customer activity. After the threshold has expired, the customer's data and the note may automatically be sent to a development team for further study.

19 Claims, 6 Drawing Sheets

WIZARD FOR ANSWERING SUPPORT INQUIRIES

BACKGROUND

Existing customer support wizards rely on pre-scripted questions based upon the particular help services available. In response to each customer answer, the wizard simply branches to a next question. Other support systems rely on keyword or natural language searching. When unanticipated customer problems arise, such techniques become inefficient, and may be unable to identify a solution, even if the solution already exists. If unable to identify the solution, these techniques are not well suited for assisting developers to create a new solution.

Another support service is a bug reporter, which collects trace information following a crash and submits a report to a developer. While such a bug reporter is of assistance to the developer, there is no systematic support provided to the customer experiencing the problem to assist the customer with their immediate needs.

DETAILED DESCRIPTION

The invention is a customer support wizard to assist a user when a problem occurs, such as a problem with a software application. When a problem occurs, the user activates the wizard using a process support function, such as a "help" button or menu. The wizard may also start automatically when a runtime fault occurs in a process.

The customer support wizard compares customer data with attributes of support notes to identify which notes are relevant, and interacting with the customer to systematically shrink the number of candidate notes by asking the customer questions. Rather than employing a pre-scripted branching sequence of questions, each question is dynamically selected based on an analysis of the attributes of the remaining candidate notes, with notes being eliminated as candidates in response to each customer answer. If no note is found, the customer's data may be sent to a support note developer's system so that a new solution can be prepared and sent back to the customer.

If a customer selects a note that is not an exact match, an assumption can be made that the note will solve the customer's problem after a threshold amount of time has transpired without receipt of a follow-up request from the customer. After the threshold has expired, the customer's data and the note may be automatically sent to the support note developer's system for further study.

This attribute-driven technique of finding a customer solution is adaptive, enabling instant integration of new support notes and support note changes into the wizard's analysis, and simplifying support note development. This flexibility benefits both the customer and support note developer, providing the customer with quick and up-to-date results and improved problem-solving autonomy, while providing the developer with improved information about customer problems and simplified distribution of solutions.

Figure 1:
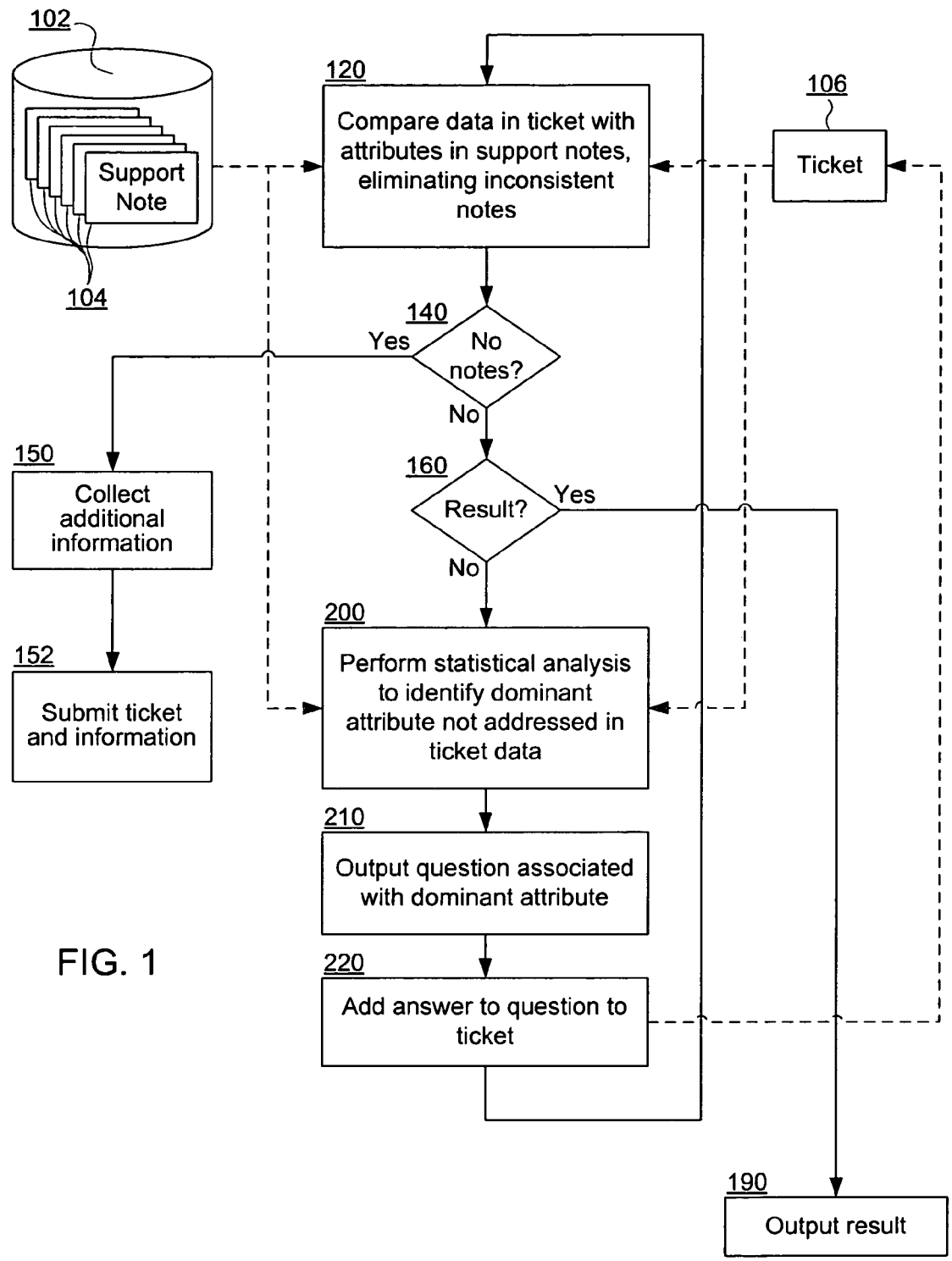
FIG. 1 illustrates an example of how an wizard operates to assist both the customer and the developer.

FIG. 1 illustrates an example of wizard operation. The wizard compares (120) data in a "ticket" 106 with attributes of support notes 104 in a support note library 102. Notes with attributes that are inconsistent with the ticket data are eliminated from consideration. Notes that do not contain an attribute corresponding to ticket data, being neither consistent nor inconsistent, are not eliminated. If all notes have been eliminated as candidates (140), additional information about the problem may be collected (150) from the user, and submitted (152) with the ticket to a support note development system (e.g., 480 in FIGS. 4 and 5) for development of a support note. This additional information may be collected through the presentation of additional questions or the completion of a form. For example, the user may be asked for comments such as a text description of the fault, or may be asked to characterize how high a priority the user would like given to solving the fault (i.e., how important is it to the user?).

If a result is reached (160) after the comparison, the result is output (190). Otherwise, the wizard performs (200) a statistical analysis of the remaining candidate notes to identify a dominant attribute that is not already addressed in the ticket data. The wizard then outputs (210) a question associated with the dominant attribute via a user interface (e.g., 410 in FIGS. 4 and 5), and adds (220) an answer received to the question to the data in the ticket 106. This process repeats until a result is reached or no candidate notes remain.

Each comparison (120) of data in the ticket 106 with attributes in the support notes 104 may include a comparison of all of the ticket data with all of the candidate notes each time, or may include a comparison of data that has not already been compared (e.g., newly added ticket data).

Each support note 104 includes a description of a problem and a solution. Support notes also include, or are organized by, a plurality of attributes. These attributes have been identified as being relevant to the occurrence of the problem addressed in the note. The attributes may be stored in any format, including a general-purpose markup language such as the eXtensible Markup Language (XML). By comparing (120) the data in the ticket 106 with the support note attributes, the wizard shrinks the possible number of solutions that might be provided to the user.

The solution may include instructions to the user, a downloadable link, and/or a piece of executable code, such as one or more patches. The link may be for a downloadable patch, or may be for downloading of a larger package such as a more general upgrade or a support package. Outputting the result (190) may include automatically downloading and/or installing a software patch or other code, outputting instructions to the user interface 410, and/or waiting for the user to indicate to take action before downloading and/or installing the patch or other code. The solution may be implemented through the service wizard, or may be implemented through other conventional software installation methods on the customer's computer system (e.g., through an upgrade/patch assistant or via a web browser download manager).

The particular question presented to the user (210) is based upon the dominant attribute resulting from the statistical analysis (200) of the candidate notes. For example, the wizard may calculate a distribution of the attributes in the candidate notes. Of the attributes not already identified as corresponding to data in the ticket, the attribute having the highest occurrence is selected as the dominant attribute, providing the basis for the next question. Selecting the attribute with the highest occurrence is most likely to eliminate the most notes when the question is answered.

As another example, each attribute may be pre-assigned a weight value to skew the analysis to favor some attributes before others. When the wizard performs the statistical analysis (200), the frequency of occurrence of the attributes in the candidate notes is combined with (e.g. multiplied by or added to) the weight values to select which attribute is dominant. For example, a value may be calculated for each attribute by multiplying the weight value times the number of occurrences and then selecting the attribute corresponding to the largest value.

The structure of questions may depend upon the type of attribute and/or an attribute description. For example, an attribute having a binary state or a threshold value might be asked as a yes/no question, while an attribute having multiple or variable states might be asked as a multiple choice question. If the question is structured as multiple choice, the wizard may provide the attribute values from the candidate notes as possible answers, as well as a choice of "none of these." If a user answers "none of these", the wizard may ask for a text answer which may then be added to the ticket.

The particular method the wizard uses to create the question is not of particular importance. For example, the questions or attribute descriptions may be embedded in the notes; may be found in a look-up table or database arranged by attribute (or by attribute type/description); may be based upon lexical structures in a knowledge base; and/or may be constructed using a "shell" question according to a type of the attribute. As an example of a "shell" structure, a concatenative shell yes-no question might be "Have you previously installed X," where the shell question is selected based on attribute type and an occurrence of a shared dominant attribute data value among the remaining notes, where "X" is the shared dominant attribute data value extracted from the remaining notes. As another "shell" example, if there is a diversity of data values for the dominant attribute, and the attribute type is associated with a multiple choice shell, the question might be "Does your system have A, B, C, or none of these" where "A", "B", and "C" are the data values for the dominant attribute extracted from the remaining notes. A natural language generation (NLG) system may also be used to generate the questions based in part upon the dominant attribute type and/or dominant attribute values.

Figure 2:
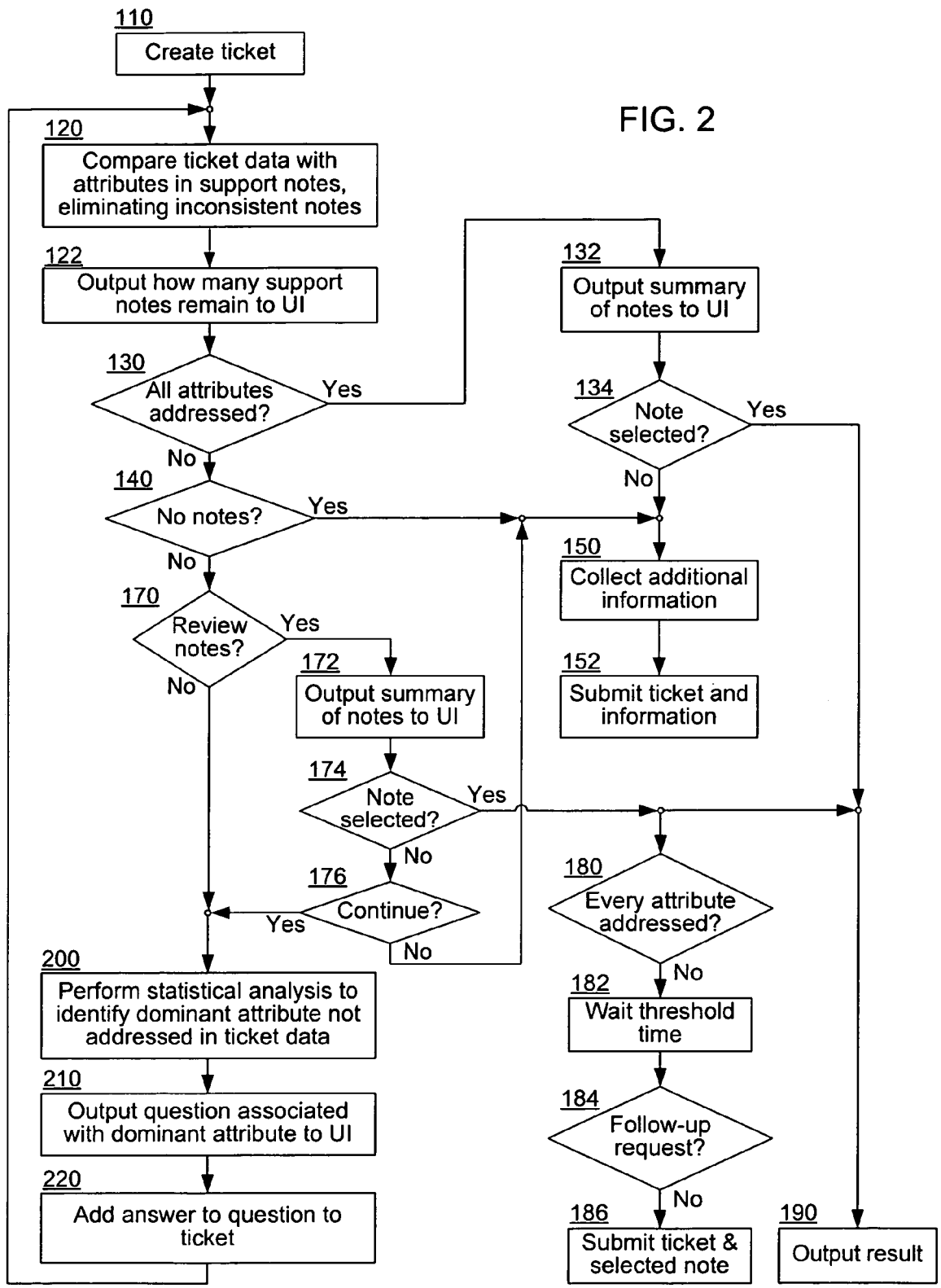
FIG. 2 illustrates another example of wizard operation, adding additional features to the example in FIG. 1.

FIG. 2 illustrates another example of wizard operation, adding additional features to the example in FIG. 1. The wizard creates (110) the "ticket" 106, automatically collecting technical and context data about the session. The technical and context data may include, among other things: general technical information about the computer system (e.g., hardware configuration); a snapshot of the user interface in which the problem occurred; information about customizing of the software package, including process and package settings; information about the operating environment, such as what processes are currently running, the number of users on the system, and performance statistics; and trace data from the running process. This automatic data collection may be performed as a background process. At least a portion of the automatic data collection may be performed periodically, in advance of any fault, and may be stored in a customer information database (e.g., 430 in FIGS. 4 and 5). Additionally, the wizard may output one or more default questions to the user interface 410 prior to the first comparison of the ticket with the notes, adding the answers to the ticket data.

After each comparison (120), the wizard outputs (122) the number of notes that might be solutions to a user interface 410. The user can survey the notes resulting from the comparison and decide whether to choose a note or to continue with the wizard. If wizard receives an indication from the user interface 410 that user wishes to review the notes (170), the notes or a summary of the notes are output (172) via the user interface 410. For example, the wizard may output a description of the problem addressed by each note for user consideration. The wizard may also provide a text search tool via the user interface 410 so that the user can check the candidate notes for particular keywords or features. If a note is selected (174), the selected note may serve as the result. If a note is not selected, the user may be given the option (176) of seeking assistance from the developer (150, 152), in which case the remaining notes are eliminated, such that no candidate notes remain. Otherwise, the wizard continues the search. As further options, if a single candidate note remains but not all attributes have been addressed, or if a plurality of candidates notes remain with identical yet-to-be addressed attributes, output of the note or notes (172) may be automatic (bypassing 170).

If a user using the wizard selects (174) a particular note, but not all of the attributes in the note have been addressed in the ticket (180), then after a threshold amount of time expires (182) (e.g., a day), an assumption may be made that the user selected the right note if the wizard does not receive a related follow-up request from the user (184). In this case, the ticket and the note (or an indication as to the identity of the note) may be submitted (186) to a support note development system (e.g., 480 in FIGS. 4 and 5) for further study.

If every attribute of every remaining candidate note is addressed in the ticket data (130), the notes or a summary of the notes are output (132) to the user interface 410. The wizard may also provide a text search tool via the user interface 410 so that the user can check the candidate notes for particular keywords or features. If the wizard receives a selection (134) of a note from the user interface 410, the note serves as the result. If no note is selected, the remaining notes are eliminated, such that no candidate notes remain.

If there are multiple candidate support notes, the output (132) to the user interface 410 may include an indication of relevance. For example, if a ticket contains one-hundred data points, a first remaining note has one-hundred attributes (all matching ticket data), and a second remaining note has eighty-five attributes (all matching ticket data, but having no attributes corresponding to fifteen ticket data points), the first note might be output with an indication of "100%," while the second note might be output with "85%."

When a single note remains and all attributes have been addressed (130), an advantage of outputting a summary of the note before treating the solution in the note as the "result" is to provide the user an opportunity to consider the problem addressed by the note before adoption of the solution, and to seek assistance from the developer (150, 152) if the user does not believe the note is applicable. Another option, of course, is to automatically treat the single note as the result (bypassing 132 and 134).

If two or more attributes tie as the dominant attribute, the wizard may ask the multiple corresponding questions prior to performing another statistical analysis (200) of the notes.

Figure 3:
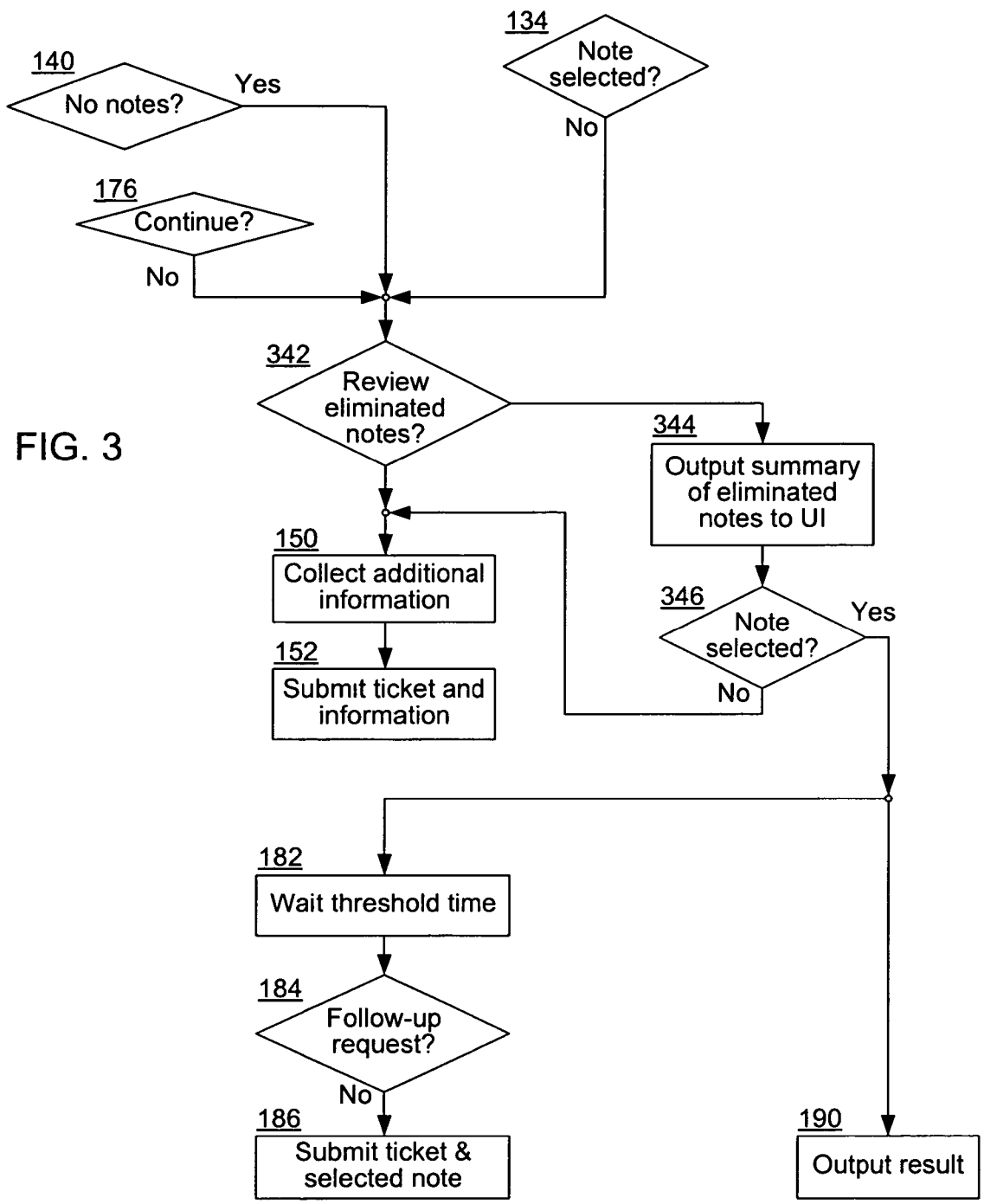
FIG. 3 illustrates a further method for considering solutions that have otherwise been eliminated from consideration, if no solution is found by the wizard as illustrated in FIGS. 1 and 2.

Also, as illustrated in FIG. 3, if no match is found, the wizard may present the user with the opportunity to consider eliminated notes. For example, if no candidate notes remain (e.g., a "YES" from 140 in FIGS. 1 and 2; a "NO" from 176 in FIG. 2; or a "NO" from 134 in FIG. 2), the wizard may provide the option (342) to review eliminated notes. For example, a user-settable software preference may indicate whether to provide the option (342), or a prompt may be provided to the user interface 410. If eliminated notes are to be presented, the notes or a summary of eliminated notes are output (344) to the user interface 410 for customer consideration. The notes that are output (344) may be, for example, the notes eliminated on the last pass or every note having fewer than a threshold number of attribute inconsistencies with the ticket. The notes may be prioritized by relevance (e.g., the number of inconsistencies), and a relevance "value" may be output with the note. The wizard may interactively present eliminated notes in passes, starting with the notes having the fewest inconsistencies or the notes most recently eliminated, and presenting increasingly less relevant (statistically) notes with every pass. The wizard may also provide a text search tool via the user interface 410 so that the user can check the notes for particular keywords or features. If a note is selected (346), then after the threshold time (182) without a follow-up request (184), the ticket and the note may be submitted (186) to the developer. Otherwise, if no note is found or the user declines to review eliminated notes, additional information may be collected (150) and sent to the developer, along with the ticket (152).

In FIGS. 1, 2, and 3, as an alternative to automatically sending the ticket back to the developer (e.g., 152, 186), the wizard may ask permission from the user. Whether permission is asked or transmission is automatic may be a user-settable software preference. Further, the customer system (400, 500 in FIGS. 4 and 5) or an intermediate system (550 in FIG. 5) may pool the tickets for a time-delayed batch transmission to the developer.

The wizard may be a locally executed application or subroutine, or may be accessed remotely over a network. Likewise, the note library 102 may be stored either locally or on a remote system.

Figure 4:
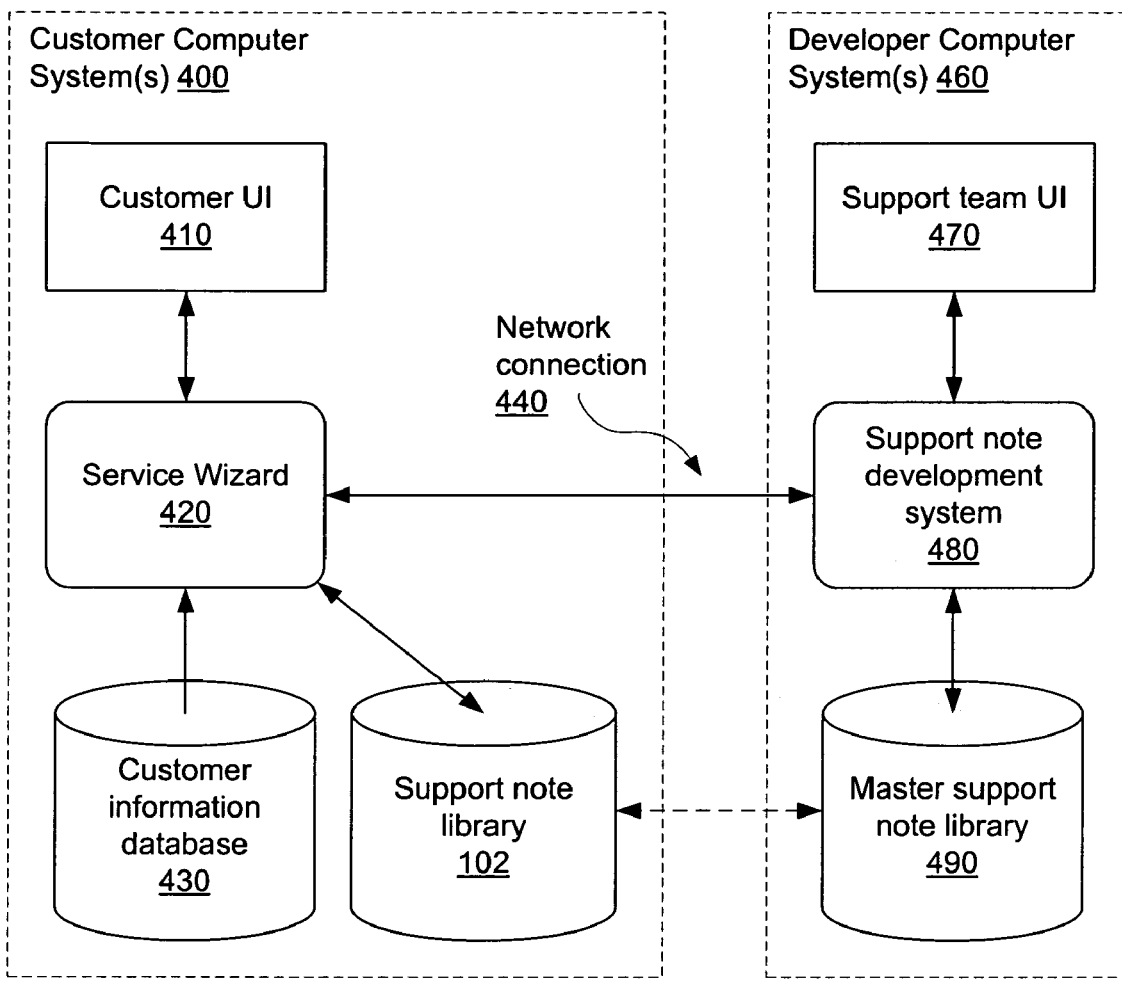
FIG. 4 illustrates an example system topography where the wizard and support note library are local to the customer's computer system.

FIG. 4 illustrates an example system topography where the wizard 420 and the support note library 102 are local to the customer's computer system 400, communicating with the support note development system 480 over a network connection 440. The support provider's computer system 460 may load note library 102 with only those notes appropriate for the customer's configuration and customizations, rather than loading all of the notes from the support provider's master library 490 (e.g., a central repository). The particular download method used to update a note library 102 is not of particular importance. For example, software on the local system 400 may automatically check a support provider system for updates, or the support provider may transmit (e.g., push; e-mail) updates to the customer. When distributing a new note to a customer that identified the problem, a flag in the note may be set for automatic installation and/or customer notification.

In addition, support notes replicated locally may have pre-filtered attributes in accordance the local configuration and customizations (i.e., include only a subset of attributes), resulting in some attributes found in notes in the support provider's library not being available in the local notes. For example, if a customer has groupware software, but not financial management software, notes for servicing problems related to the financial management software may be omitted, and notes for servicing problems related to the groupware software may be pre-filtered to eliminate attributes related to having the financial management software.

The hardware and/or software configuration of the customer's computer system 400 and other customizations may be stored in a customer information database 430. This data may be updated for the customer's computer system 400 on a regular basis. Some or all of this data may be included in the customer's ticket 106.

Figure 5:
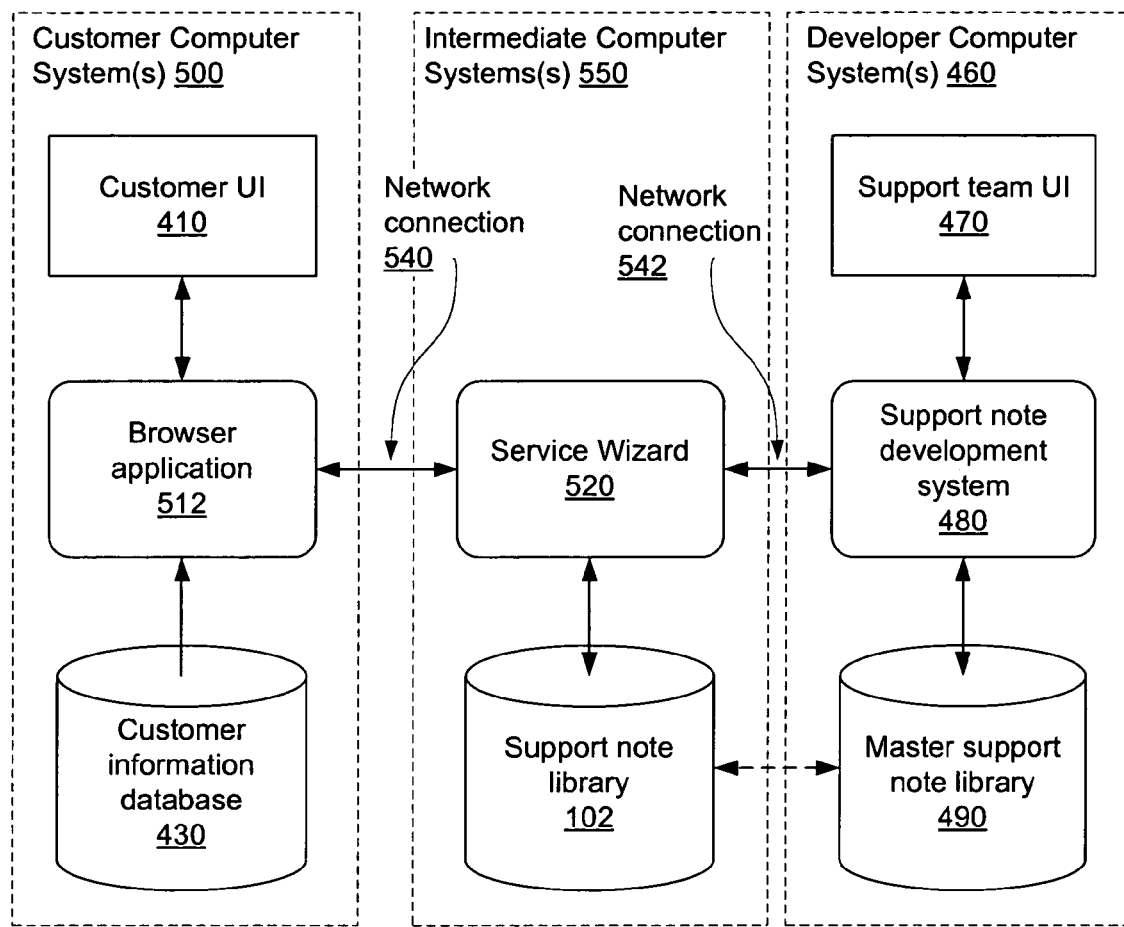
FIG. 5 illustrates an example system topography where the note library and the service wizard are located on an intermediate system, in-between the customer's computer system and the developer's computer system.

FIG. 5 illustrates an example system topography where the note library 102 and the service wizard 520 are located on an intermediate system 550, in-between the customer's computer system 500 and the developer's computer system 560. The user interacts with service wizard 520 via a web browser 512 over a network connection 540, and the wizard 520 communicates with the support note development system 480 over network connection 542. For example, the service wizard 520 may use hypertext transport protocol pages to output (210) the questions to the web browser 512 for rendering to the user interface 410 of the customer's computer system 500. As described with FIG. 4, the support notes on the intermediate system 550 may be tailored to the configurations and customizations of the customer. Alternatively, the support notes on the intermediate system 550 might be a unified library for all customers or a plurality of tailored libraries organized in accordance with standard configurations.

FIGS. 4 and 5 are intended as demonstrations of the concept of having a local wizard and a remote wizard. These configurations are otherwise entirely flexible and interchangeable. For example, in FIG. 5, the customer information database may be maintained on the intermediate system 550. Further, the intermediate computer system 550 and the developer's computer system 460 may be combined, and the service wizard 520 and support note development system 480 may be executed as subroutines on a same computer system.

Based on the content of the ticket 106, the wizard (420, 520) or a sorting system of the support note development system 480 may route the ticket, or tag the ticket for routing, to a particular development/support team responsible for developing solutions. For example, the support team may be selected based upon which application program is indicated in the ticket 106, and/or based upon team load and availability. The development/support team uses the ticket data to create a new note via user interface 470 after determining which attributes are critical to occurrence of the fault. After the new note is prepared, the support note development system 480 may be distribute the note to one or more note libraries 102, and send a notification to the customer or customers who identified the problem.

After a ticket and note identifier are received from a service wizard (420, 520) (e.g., from 186 in FIGS. 2 and 3), the support note development system 480 may also tag the note for association with the values presented in the ticket, providing an indication of the differences found between the ticket and the note. The ticket and tagged note are provided to the support/development team to identify whether attributes should be added to, or deleted from, the note so that the solution can be identified more quickly in the future, or whether a new note should be created.

The support note development system 480 may use any queuing technique to prioritize action on received tickets. Priority may be based, for example, upon the order of receipt; the age of the ticket; terms of a service agreement with the originating user; the priority attributed to the fault by the user; a statistical comparison of received tickets to determine the number of occurrences of a fault; the frequency with which a particular non-matching note has supplied customers with the solution; and/or the complexity of the problem (e.g., how many or few user answers are included in the ticket, how many processes were running when the fault occurred, etc.).

The support note development system 480 may include a tool to compare all of the support notes in the master library 490 and assure that no two notes have the exact same attributes with the exact same data values. This can help minimize the analytical burden on a customer. If the development/support team attempts to introduce a support note having the same attributes as an existing note, the tool may automatically prevent entry of the new support note. The tool may also perform a comparison between attributes of a new note and existing notes as the new note is developed, either automatically or at a developer's request. Also, each note having the same attribute data values may be presented to the development/support team so that distinguishing attributes may be added to at least one of the notes, or so the notes may be combined.

Figure 6:
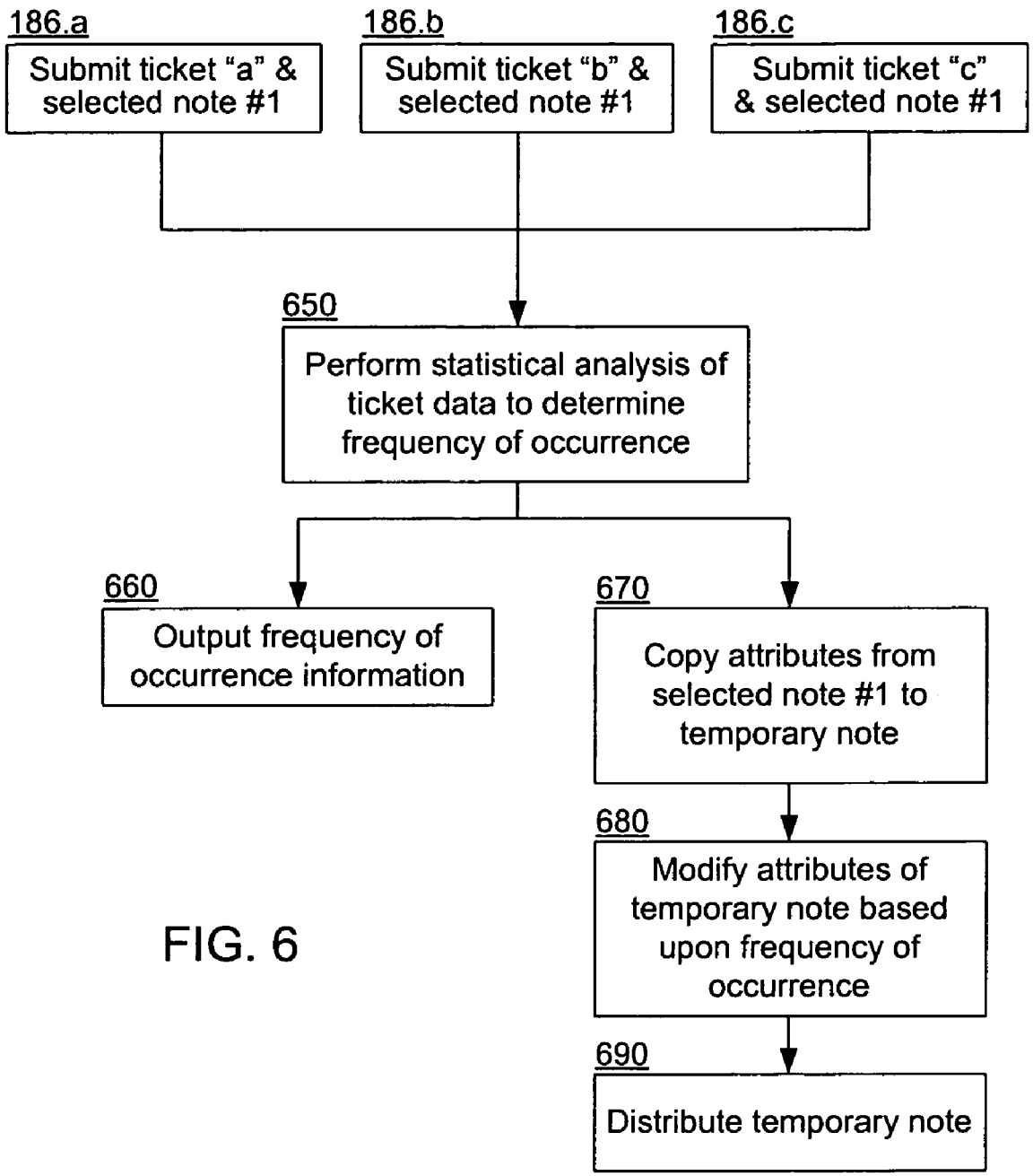
FIG. 6 illustrates a method of pooling tickets for analysis and automatic preparation of temporary support notes.

As illustrated in FIG. 6, when multiple users have selected and submitted a same note (e.g., 186.*a*, 186.*b*, and 186.*c*), the support note development system 480 may pool the tickets to assist the development team. In this role, the support system, 480 may perform a statistical analysis (650) of the values appearing in the pooled tickets to determine a frequency of occurrence of ticket data that is different from the selected note. For example, if the wizard was unable to find an exact match and users have chosen a same note from one the closest notes, the system can identify the frequency of occurrence of values in the ticket which do not appear in the note to help identify attributes that might not be critical to the utility of the note. The frequency of occurrence information may be output (660) to the support team's user interface 470 for review.

Further, as a temporary measure, the support note development system 480 may automatically create a temporary note (i.e., a new note or an association, such as a link or alias, to the existing note) without requiring human intervention. At least some of the attributes are copied (680) from the selected note into the temporary note. The solution may also be copied to the temporary note, if the temporary note is a new note. If an existing attribute value is inconsistent with the ticket data and contradictory (e.g., if the attribute type has a binary yes/no state), the attribute may be omitted in the temporary note. If the attribute values are inconsistent but not contradictory, the attribute values may be amended to incorporate the corresponding data. If an attribute in the note is not addressed in the ticket data, the attribute may also be omitted in the temporary note. If there is data in the tickets that does not correspond to an attribute, an attribute may be added to the temporary note based on the ticket data.

Whether or not to omit, amend, or add an attribute to the temporary note (680) may be based upon the frequency of occurrence of these differences between the pooled tickets and the selected note. The frequency of occurrence threshold for modification, and whether certain attributes or attribute types may be modified, may be specified by preferences set on the developer's computer system 460, and/or in the original note itself. For example, the support provider may specify that certain attribute values are critical to the original note (e.g., "locked"), that certain attributes may be relevant (e.g. may be amended or added if the frequency of occurrence exceeds a threshold percentage), or that certain attributes may be incidental (e.g., deleted if the frequency of occurrence exceeds a threshold percentage). For each attribute or attribute type a threshold may be individually set for each of omitting, amending, and adding. A threshold may also be set for how many pooled tickets must be received for a same selected note before a temporary note is created.

The temporary note may include a flag for the user, indicating that the note has not been tested as a solution. The number of users who have selected the note for the problem may also be provided. The temporary note may also include an expiration date. Once created, temporary notes may be distributed (690) to the various support note libraries. Individual libraries may also be set to accept or not accept temporary notes.

While the flow charts of the various drawing illustrate the choices and actions in a particular order, it should be recognized that the order of choices and actions can be changed while achieving the same or substantially the same results.

The various computer systems (e.g., 400, 460, 500, 550) may each include a storage component for storing machine-readable instructions for performing the various processes described above and illustrated in FIGS. 1-3 and 6. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform.

Each user interface (e.g., 410, 470) may include, for example, a graphical or text-driven display; one or more input devices such as a keyboard, a pointing device (e.g., mouse, trackpad, trackball); and/or an interactive voice response (IVR) system. If an IVR system is included, a script generator may be used to convert the questions and other information output from the service wizard into a script for the IVR system. However, the script generator is not necessarily required, depending on the format of output generated by the wizard and the capabilities and sophistication of the IVR system. For example, IVR systems are commercially available that directly process XML documents.

Several examples of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method comprising:
creating a ticket, automatically collecting technical and context data about a session on a computer and storing the data in the ticket;
comparing data in the ticket with attributes of a plurality of support notes;
responsive to the comparison, eliminating support notes as candidates that have attributes which are inconsistent with the ticket data;
performing a statistical analysis of the support notes remaining after the elimination to identify a dominant attribute not addressed in the ticket data;
responsive to the statistical analysis, outputting a question associated with the dominant attribute, and adding an answer received to the question to the ticket data;
thereafter, repeating the comparing, eliminating, performing, outputting, and adding, until either a result is reached or no candidate note remains; and
outputting said result, if a result is reached,
wherein each support note is associated with a problem, a solution, and a plurality of attributes.

2. The method of claim 1, wherein if no candidate note remains, transmitting the ticket for development of a support note.

3. The method of claim 1, wherein a result is reached when:
- a selection of a candidate support note is received from a user interface; or
- every attribute of remaining support notes is addressed in the ticket data.

4. The method of claim 3, further comprising, responsive to the comparison:
- outputting how many support notes remain as candidates via the user interface; and
- enabling, via the user interface, review of the candidate support notes and selection of a candidate support note.

5. The method of claim 4, further comprising, if the selection of a candidate support note is received from the user interface, but not every attribute of the support note is addressed in the ticket data:
- waiting until a threshold amount of time has transpired, and if there has been no follow-up request for a different support note, transmitting the ticket and an indication of which support note was selected for analysis.

6. The method of claim 5, further comprising:
- receiving multiple tickets associated with selection of a same support note at a support note development system;
- responsive to receiving the multiple tickets associated with the selection of the same support note, performing a statistical analysis of data in said multiple tickets to determine a frequency of occurrence of ticket data that does not correspond to attributes in said same support note; and
- output the frequency of occurrence information.

7. The method of claim 6, further comprising:
- automatically creating a temporary support note, copying at least some of the attributes from said same support note, and adding additional attributes based upon a subset of the data in said multiple tickets which does not appear in said same support note, based in part upon said frequency of occurrence of ticket data that does not correspond to attributes in said same support note; and
- distributing the temporary support note.

8. The method of claim 3, wherein if no candidate note remains:
- enabling, via the user interface, review of the eliminated support notes and selection of an eliminated support note.

9. The method of claim 1, wherein the statistical analysis identifies the dominant attribute by calculating which attribute has a highest occurrence in remaining support notes and is not addressed in the ticket data.

10. The method of claim 1, wherein each attribute has a weight value, and the statistical analysis identifies the dominant attribute by combining a number of occurrences of a respective attribute with its weight value, and selecting the attribute not addressed in the ticket data and having a largest resulting value.

11. A machine-readable medium storing instructions adapted to be executed by a processor to perform a method comprising:
- creating a ticket, automatically collecting technical and context data about a session on a computer and storing the data in the ticket;
- comparing data in the ticket with attributes of a plurality of support notes;
- responsive to the comparison, eliminating support notes as candidates that have attributes which are inconsistent with the ticket data;
- performing a statistical analysis of the support notes remaining after the elimination to identify a dominant attribute not addressed in the ticket data;
- responsive to the statistical analysis, outputting a question associated with the dominant attribute, and adding an answer received to the question to the ticket data;
- thereafter, repeating the comparing, eliminating, performing, outputting, and adding, until either a result is reached or no candidate note remains; and
- outputting said result, if a result is reached,
- wherein each support note is associated with a problem, a solution, and a plurality of attributes.

12. The machine-readable medium according to claim 11, further comprising instructions to transmit the ticket for development of a support note, if no candidate note remains.

13. The machine-readable medium according to claim 11, wherein a result is reached when:
- a selection of a candidate support note is received from a user interface; or
- every attribute of remaining support notes is addressed in the ticket data.

14. The machine-readable medium according to claim 13, further comprising instructions, responsive to the comparison, to:
- output how many support notes remain as candidates via the user interface; and
- enable, via the user interface, review of the candidate support notes and selection of a candidate support note.

15. The machine-readable medium according to claim 14, further comprising instructions to wait until a threshold amount of time has transpired if the selection of a candidate support note is received from the user interface, but not every attribute of the support note is addressed in the ticket data, and if there has been no follow-up request for a different support note, to transmit the ticket and an indication of which support note was selected for analysis.

16. The machine-readable medium according to claim 13, further comprising instructions to enable, via the user interface, review of the eliminated support notes and selection of an eliminated support note, if no candidate note remains.

17. A system comprising:
- a customer information database storing hardware and software configuration information;
- a support note library storing a plurality of support notes, each support note comprising a problem, a solution, and a plurality of attributes;
- at least one processor and a memory, the processor to execute instructions from the memory
    - to create a ticket, automatically collect technical and context data about a session on a computer and store the data in the ticket;
    - to compare data in the ticket including at least some of the configuration information from the customer information database with attributes of the support notes in the support note library,
    - responsive to the comparison, to eliminate support notes as candidates that have attributes which are inconsistent with the ticket data,
    - to perform a statistical analysis of the support notes remaining after the elimination to identify a dominant attribute not addressed in the ticket data,
    - responsive to the statistical analysis, to output a question associated with the dominant attribute, and to add an answer received to the question to the ticket data,
    - thereafter, to repeatedly compare, eliminate, perform, output, and add, until either a result is reached or no candidate note remains, and
    - to output said result, if a result is reached.

18. The system of claim 17, further comprising a user interface to output the question associated with the dominant attribute, and to receive the answer to the question.

19. The system of claim 18, further comprising a network connection linking the user interface to the processor.

* * * * *